Aug. 8, 1944. H. O. HEM 2,355,293
WEIGHING SCALE
Filed Jan. 15, 1942 3 Sheets-Sheet 1
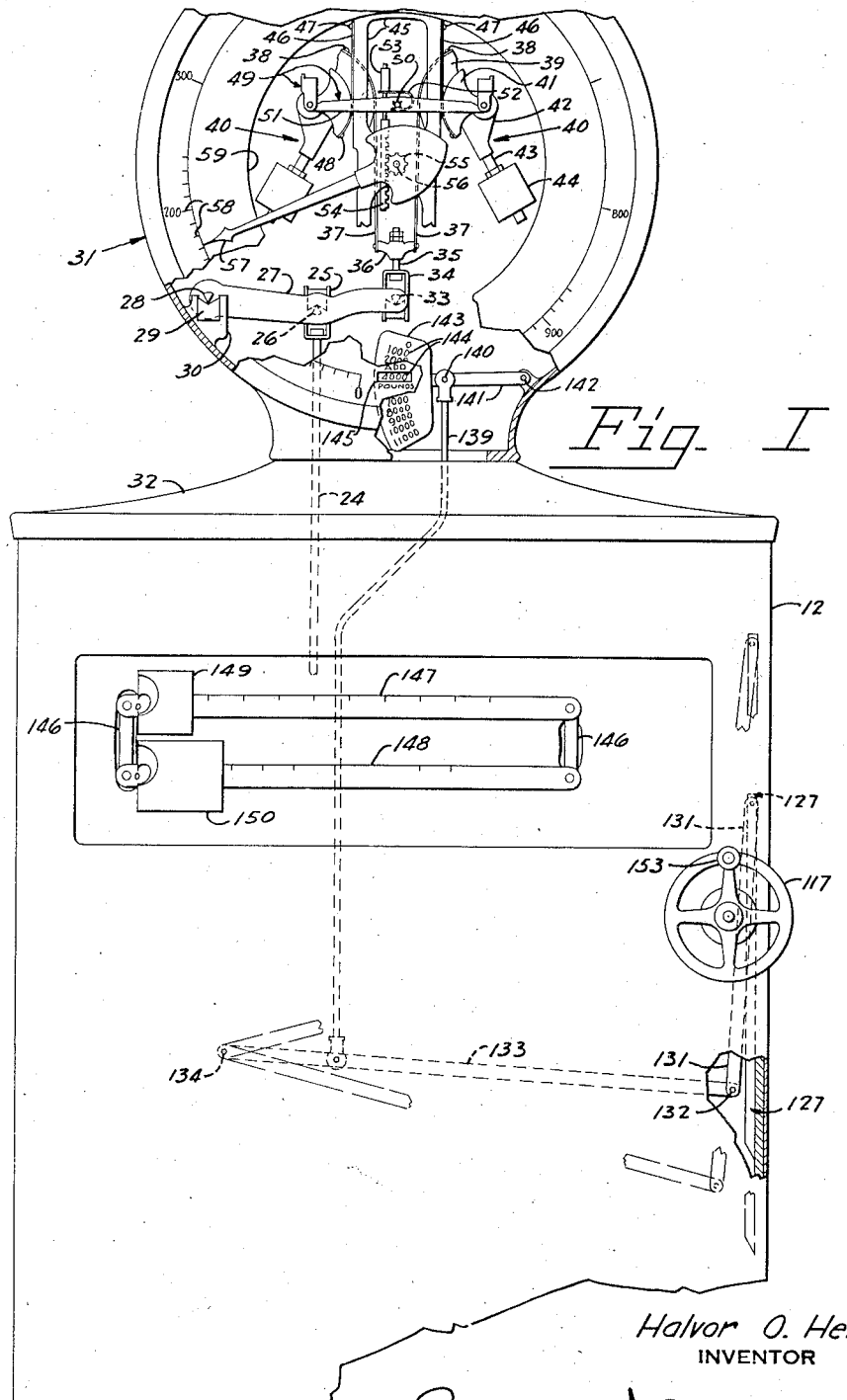
Fig. I
Halvor O. Hem
INVENTOR
BY Marshall & Marshall
ATTORNEYS

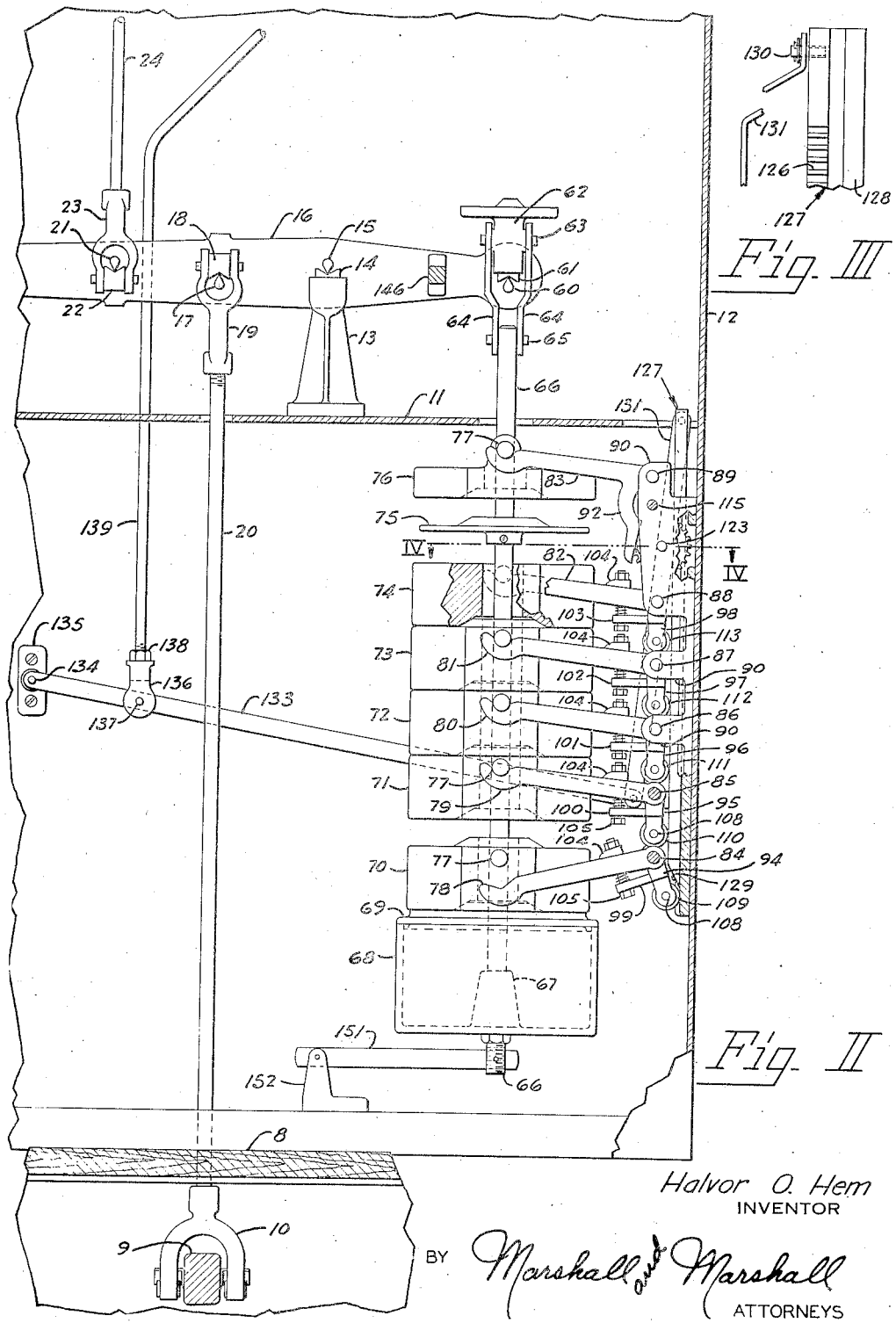

Aug. 8, 1944.   H. O. HEM   2,355,293
WEIGHING SCALE
Filed Jan. 15, 1942   3 Sheets-Sheet 3
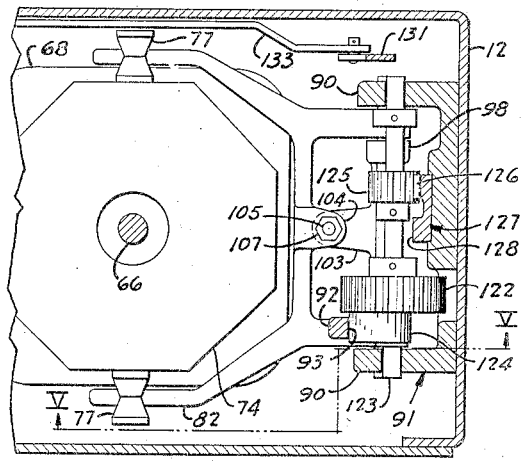
Fig. IV
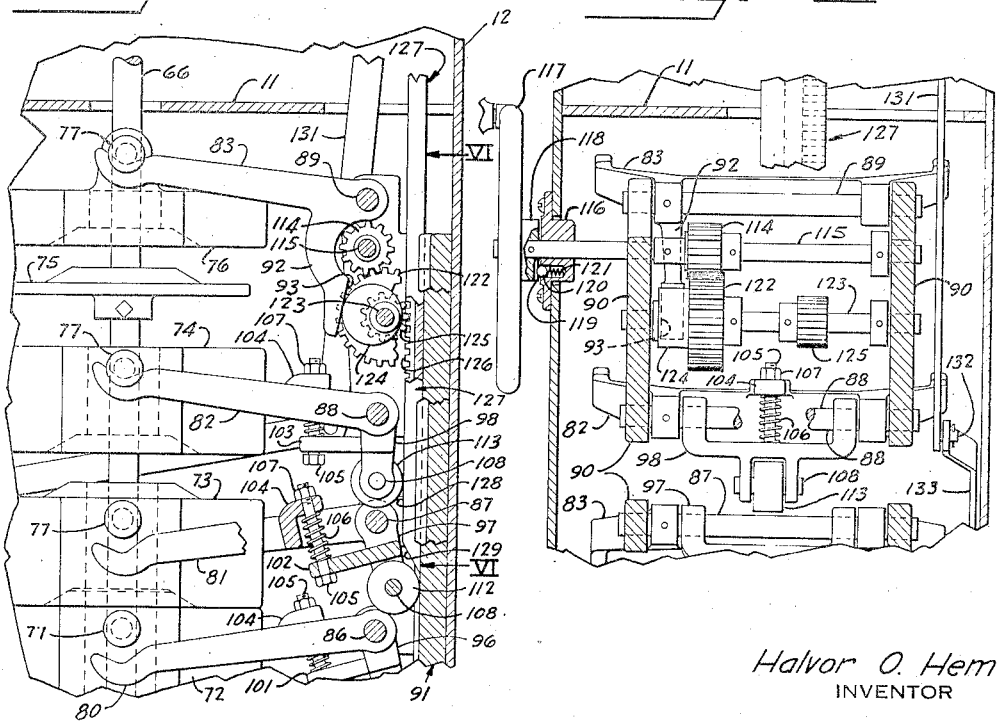
Fig. V    Fig. VI
Halvor O. Hem
INVENTOR
BY Marshall and Marshall
ATTORNEYS Patented Aug. 8, 1944

2,355,293

UNITED STATES PATENT OFFICE 2,355,293

WEIGHING SCALE

Halvor O. Hem, Toledo, Ohio, assignor to Toledo Scale Company, Toledo, Ohio, a corporation of New Jersey Application January 15, 1942, Serial No. 426,796

10 Claims. (Cl. 265—48)

This invention relates generally to weighing scales, and more particularly to weighing scales having an automatic load counterbalancing mechanism and a plurality of manually actuated unit weights for augmenting the weighing capacity of the automatic load counterbalancing mechanism.

Scales of this kind heretofore were usually equipped with a series of unit weights, suspended from each other by means of slotted lugs engaging spool-like projections extending from each weight in the manner of a chain. The weight of each of these unit weights in scales of this kind is such that when one of them is placed on, or suspended from, a lever of the scale, its moment is just sufficient to counterbalance the pull on the lever resulting from a weight equal to the automatic weighing capacity of the scale, i. e., the chart capacity. When a load placed on the platform whose weight is equal to, or greater than, the automatic weighing capacity has caused the load counterbalancing pendulums to swing into the position in which they counterbalance this load, one of the unit weights when applied will return the pendulums into their initial position and thus condition the pendulums for counterbalancing another load increment whose weight is equal to the automatic weighing capacity.

The number of unit weights that can be provided in scales of this type however is limited. In addition to the space they occupy, they must also be spaced from each other when not in operative position to provide clearance for the angular travel of the lever which is adapted to receive them.

In scales of this type the automatic weighing capacity of the scale is limited by the number of weight graduations that can be marked on the weight indicating chart. These must be so spaced that they may be easily read.

The principal object of the present invention is therefore the provision of an improved unit weight structure.

Another object is the provision of an improved unit weight actuating mechanism.

Another object is the provision of means whereby with a certain number of unit weights twice as many load increments can be counterbalanced.

These, and other objects and advantages will be apparent from the following description in which reference is had to the accompanying drawings, illustrating a preferred embodiment of the invention and in which similar reference numerals refer to similar parts throughout the several views.

Referring to the drawings:

Fig. I is a front elevational view of a scale embodying the invention.

Fig. II is an enlarged sectional view of the unit weight mechanism clearly showing its relation to the beam lever of the scale and to the load supporting means.

Fig. III is an enlarged fragment of the upper end of the unit weight operating rack, showing in detail the manner of its connection to unit weight indicating means.

Fig. IV is an enlarged fragmentary plan view of the unit weight and unit weight actuating means, sectioned substantially along the line IV—IV of Fig. II.

Fig. V is an enlarged fragmentary side elevation of a portion of the unit weight mechanism sectioned substantially along the line V—V of Fig. IV, showing unit weight actuating means in detail; and Fig. VI is an enlarged fragmentary end elevation sectioned substantially along the line VI—VI of Fig. V.

Referring to the drawings in detail:

Since the embodiment of this invention may be used in connection with any preferred type of scale lever and platform structure, and it per se forms no part of this invention, the platform and lever system is not shown in detail. A fragment of a platform 8, a nose 9 of the lever system, and a connecting stirrup 10 are illustrated in Fig. II.

Mounted upon a shelf 11 of a scale casing or cabinet 12 is a fulcrum stand 13 provided with bearing blocks 14 in its upper end. These bearing blocks, which are preferably of the self-aligning type, support fulcrum pivots 15 of a beam lever 16. Laterally extending load pivots 17, which are in spaced relation to the fulcrum pivots 15, support suitable bearings 18 of a stirrup 19 fixed to the upper end of a draft rod 20 whose lower end, by means of the stirrup 10, engages the nose 9 of the platform supporting lever system. Laterally extending power pivots 21 in the lever 16 engage a suitable bearing 22 in a stirrup 23 suspended from the lower end of a draft rod 24 whose upper end, by means of a stirrup 25, engages load pivots 26 in a pendulum lever 27. This pendulum lever is provided with fulcrum pivots 28 by means of which it is supported upon suitable bearings 29 mounted in a fulcrum bracket 30 in the interior of a substantially watchcase-shaped indicator housing 31 which is erected upon a rigid deck 32 of the casing or cabinet 12.

To transmit the pull of a load, a power pivot 33, in the nose of the pendulum lever 27, engages a suitable bearing in a stirrup 34 suspended from the head of a bolt 35 threaded and locked into a yoke 36. Parallel faces of this yoke are clamped to the lower ends of flexible metallic ribbons 37 whose upper ends overlie and are clamped as at 38 to the upper ends of arcuate faces of power sectors 39. Each of these power sectors 39 is a component part of a load counterbalancing pendulum 40. In addition to the power sectors 39, each pendulum 40 comprises a pair of fulcrum sectors 41, one of which being positioned on each side of the power sector, a pendulum body 42, having a stem 43 studded in its lower end, and a pendulum weight 44 that is adjustably threaded on the pendulum stem 43 in the usual manner.

These pendulums 40 are operatively mounted upon a pendulum frame 45 by means of flexible metallic ribbons 46 whose upper ends are clamped as at 47 to parallel machined faces of the pendulum frame 45. The lower ends of the ribbons 46 overlie the arcuate faces of the fulcrum sectors 41 to whose lower ends they are clamped as at 48.

For the purpose of actuating a weight indicator, a compensating frame 49 is pivotally attached to the centers of revolution of the load counterbalancing pendulums 40, and at a point midway the axes of pivotal attachment, a rack supporting bar 50 is pivotally mounted in the side plates 51 of this compensating frame. Secured to this rack bar is a curved shock absorbing plate 52 carrying an adjustable rack foot 53 into which the stem of a depending rack 54 is adjustably threaded. Teeth of this rack 54 mesh with the teeth of a pinion 55 circumjacently mounted upon an indicator shaft 56 whose tenon ends rest in antifriction ball bearings (not shown) which are fixed in horizontally extending flanges of the pendulum frame 45. To one of the tenons extending beyond the horizontally extending flange an indicator 57 is securely clamped.

By virtue of the above described structure, when a load is placed on the platform 8 the pendulum lever 27 is deflected in a clockwise direction until the torque of the pendulums, which move outwardly and upwardly, balances the moment of the load on the platform. The compensating frame 49, being pivotally attached to the centers of rotation of these pendulums, partakes of this movement and since this upward movement is a function of the weight of the load the indicator 57 rotates through an angle proportionate to the load and is therefore adapted to indicate the weight in cooperation with a series of weight indicia 58 printed on an annular chart 59 which is bolted to suitably spaced bosses (not shown) in the interior of the indicator housing 31 immediately in back of the indicator 57.

Fixed in the lever 16, extending on the opposite side of the fulcrum pivots 15, are pivots 60 projecting laterally from each side of an expanded portion. These pivots support bearing blocks 61 alignably seated in the lower end of a bracket 62, and suspended from the ends of a pin 63, extending through this bracket perpendicular to the axis of the pivot 60, are two stirrup plates 64 which, by means of a pin 65, suspendingly retain the upper end of a unit weight supporting stem 66 whose lower end is threaded through a boss 67 in the interior of a hollow loading box 68 whose cover 69 serves as a receiver for the lowermost unit weight of a series of unit weights 70, 71, 72, 73 and 74 which when functioning to counterbalance increments of load rest on each other. In the illustrated embodiment of this invention the weight of each unit weight 70 to 74 inclusive is such that its moment counterbalances a load on the platform 8 weighing twice the "chart capacity."

Circumjacently on and clamped to the stem 66, in spaced relation to the uppermost unit weight 74, is a second weight receiver 75 which serves to receive a unit weight 76. The weight of this unit weight is exactly one-half of that of the unit weights 70 to 74, therefore its moment counterbalances a load on the platform equal to the chart capacity of the scale.

Each of the unit weights 70 to 74 and 76, which have a substantial octagonal shape, has studded into opposite sides spool-like extensions 77 which are adapted to be engaged by the V grooved ends of forked unit weight lifting arms 78, 79, 80, 81, 82 and of an operating lever 83 respectively. These forked arms and the lever 83, by means of spaced extensions, are freely mounted on shafts 84, 85, 86, 87, 88 and 89 respectively which project through inwardly extending flanges 90 of a unit weight supporting bracket 91 securely fastened to one of the side walls of the cabinet 12 in its interior. The forked lever 83 (Figs. IV and V) has an integral downwardly directed extension 92 having a flat face 93. The purpose of this extension will later be more particularly explained. Also seated on the shafts 84, 85, 86, 87 and 88, between the spaced furcations of the forked lifting arms, are spaced extensions of lever operating members 94, 95, 96, 97 and 98. These members have laterally projecting fingers 99, 100, 101, 102 and 103 respectively, and extending through drilled holes in these fingers and in the flanges 104 of the lifting arms are bolts 105. Circumjacently mounted on each of these bolts, between the finger and the flange, is a relatively stiff compression spring 106. Nuts 107, threaded on the bolts 105, serve to compress the springs 106 and to lock the lifting arms 78, 79, 80, 81, 82 and the respective members 94, 95, 96, 97 and 98 into relatively rigid units. Each unit in effect becomes a two-armed unit weight operating lever of the first order which is fulcrumed upon one of the shafts of the series of shafts 84 to 88 inclusive.

The free ends of the lever operating members 94 to 98 inclusive are provided with spaced extensions and rotatably mounted upon short shafts 108 projecting through these extensions are rollers 109, 110, 111, 112 and 113.

The springs 106 in the assembled unit weight operating levers serve to absorb shock when the unit weights are actuated. For the purpose of sequentially actuating the operating levers, a gear mechanism is provided. This comprises a pinion 114 which is pinned to a shaft 115 extending between the flanges 90 of the bracket 91. The forward end of this shaft projects through a bore in a bushing 116 fixed in the front wall of the cabinet 12, and to the portion of the shaft 115 that extends exteriorly of the cabinet 12 is keyed a handle or handwheel 117. The inner face of a hub 118 of the handwheel 117 is provided with a machined notch 119 which serves to center or position the handwheel with the aid of a steel ball 120 seated in a bore in the bushing 116. The ball 120 is urged to enter the notch 119 by a compression spring 121 seated in the bore. The teeth of the pinion 114 mesh with the teeth of a gear 122 keyed to a shaft 123 extending parallelly to the shaft 115, between the flanges 90 of the bracket 91. Extending laterally from the gear 122 is an integral eccentric cam 124 whose face engages the flat surface 93 of the downwardly directed extension 92 of the lifting lever 83. The pitch diameters of the pinion 114 and of the gear 122 are so proportioned that for each complete revolution of the pinion the gear is rotated through an angle of 180°.

Also pinned or keyed to the shaft 123 is a pinion 125 whose teeth mesh with the teeth of a rack 126 cut in one of the spaced faces of a slide 127 which is mounted for vertical sliding movement in a machined groove of the bracket 91. Another spaced face 128 of the slide 127 is smooth and serves as a track-like abutment for the rollers 109 to 113 inclusive. The lower edge of the slide 127 is provided with a bevel 129 for a purpose which will later become clear. Studded into one side of the slide 127, immediately adjacent its upper end, is a pin 130, the extending portion of which enters an opening in the upper end of a suitably bent link 131 whose lower end as at 132 is pivotally connected to a flash operating lever 133 whose other end is pivoted on a stud 134 projecting laterally from a bracket 135 which is fastened to the rear wall of the casing or cabinet 12.

A clevis 136 pivotally mounted upon a pin 137, extending through the flash operating lever 133, has locked in its upper end, by means of a nut 138, the lower end of a flash operating rod 139. The upper end of this rod, which is suitably bent to enter the housing 31, is provided with a clevis 140 which pivotally engages a lever 141 fulcrumed as at 142 to a suitable boss within this housing. The opposite end of the lever 141 supports a flash 143 provided with a series of weight indicia 144 which are adapted to be exposed in a small window 145 in the chart 59.

The lever 16 is provided with arms 146 which extend through the front wall of the cabinet 12, and fastened to the extending ends of these arms are tare and capacity beams 147 and 148 respectively. These, with the poises 149 and 150, serve their usual function.

To prevent swinging of the loading box 68, a check link 151 is provided whose opposite ends pivotally engage the lower end of the supporting stem 66 and a bracket 152 fastened to the bottom of the cabinet 12; and to facilitate the operation of the handwheel 117, this is provided with a handle 153.

Assuming that the automatic weighing capacity of the scale embodying the invention is 1000 pounds, the weight of any load placed on the platform 8 whose weight is less than 1000 pounds is directly indicated by the indicator 57 on the chart 59 in the usual manner. If a load weighing 1500 pounds is placed on the platform 8, when there are no unit weights suspended from the lever 16, the moment of the load causes the pendulums to swing outwardly until they strike suitable stops (not shown) that are provided for this purpose, and the indicator 57 by coming to rest at a point beyond the 1000 pound indicium of the series 58 gives notice to the operator that the weight of the load is greater than 1000 pounds. The operator now grasps the handle 153 of the handwheel 117 and gives this handwheel one complete turn. When this handwheel starts to rotate the small steel ball 120, which serves to center the handwheel 117, is forced out of the machined slot 119 against the pressure of the spring 121 and when the wheel has completed the turn it again enters the notch 119 in the hub of this handwheel. The resulting "click" indicates that the turn has been completed and the entry of the ball into the notch again definitely positions the members controlled by this handwheel.

The pinion 114, which is mounted on the shaft 115 on which the handwheel 117 is fastened, thus also rotates through one complete revolution but having only one-half the number of teeth that the gear 122 has with which it meshes, it causes this gear to rotate through an angle of 180°. When the gear 122 is rotated, the face of the eccentric cam 124, which is integral therewith, recedes. The flat face 93 of the extension 92 of the lever 83 follows the face of the cam and the lever 83 rocks about its fulcrum on the shaft 89 and thus gently deposits the unit weight 76 on the receiver 75 clamped to the stem 66. The cam 124 is designed and proportioned to cause the lever 83 to deposit the unit weight 76 on the receiver and then to continue its rocking movement into a position below the receiver so that it will not interfere with the free oscillation of the lever 16 from which the unit weight 76 is now suspended. As has been previously mentioned, the unit weight 76 is adapted to counterbalance a load equal to the chart capacity, therefore in this example when it is deposited on the receiver 75 it counterbalances an increment of 1000 pounds of the load on the platform 8 and since the remaining increment of 500 pounds is within the chart capacity it is counterbalanced by the pendulums 40 and its weight is indicated by the cooperation of the indicator 57 and the series 58 of indicia on the chart 59.

When the handwheel 117 is turned to deposit the unit weight 75, the gear 125 partakes of the rotating movement since it is keyed to the shaft 123 on which the gear 122 is mounted and since it meshes with the rack 126 cut in the slide 127 this slide moves upwardly a predetermined distance, and this upward motion is transmitted through the link 131 to the flash operating lever 133. The lever 133 in consequence is rocked about its fulcrum on the stud 134 and the movement of this lever is then transmitted through the flash operating rod 139 to the lever 141 fulcrumed in the interior of the indicator housing 31. This lever is thus also rocked about its fulcrum through a definite angle and the flash 143 exposes the numeral 1000 of the series 144 in the window 145, notifying the operator of the scale that this indicated amount must be added to the weight indicated by the indicator 57 on the chart 59.

Assuming that all the unit weights are in their inoperative positions, and a load, weighing for example 4172 pounds, is placed on the platform 8, the "pull" of this load is transmitted, through the means previously described, to the pendulums 40. These immediately swing into their uppermost position against the previously referred to stops. Since the load is in excess of the counterbalancing capacity of these pendulums, the indicator 57 again comes to rest at a point beyond the 1000 pound indicium of the series 58 on the chart 59. The operator then, in the manner hereinbefore described, deposits the unit weight 76. Since this adds only 1000 pounds to the counterbalancing capacity of the scale, the indicator remains stationary. The operator then turns the handwheel 117 through another revolution. The cam 124 during the second half of its revolution forces the extension 92 of the lever 83 outwardly thus raising the end of this lever which in its upward movement engages the spool-like extensions 77 of the unit weight 76 and lifts this unit weight off the receiver. Simultaneously the lowermost unit weight 70 of this series is deposited on the loading box cover or receiver 69 so that now its weight moment acts in opposition to the moment of the load acting on the draft rod 20. This is accomplished in the following manner.

Rotation of the shaft 123, on which the cam 124 is mounted, causes the gear 125 to raise the slide 127 an additional distance and the roller 109 mounted in the operating member 94 of the unit weight lever 78, which heretofore has been resting against the abument formed by the face 128 of the slide 127 and which heretofore maintained the lever 78 in its raised position, now glides along the face of the beveled portion 129 on the end of this slide 127 as it is moving upwardly until this roller comes to rest against the bottom of the groove in the unit weight supporting bracket 91 in which the slide is movably mounted. This causes the lever 78, supporting the unit weight 70, to rock in an anticlockwise direction about its fulcrum on the shaft 84 and to deposit the unit weight 70 on the unit weight receiver 69.

Since this unit weight is capable of counterbalancing only 2000 pounds of load, the indicator still remains in the position it assumed when the load was placed on the platform. The operator then rotates the handwheel 117 through another revolution and in the described manner the unit weight 76 is again deposited on the receiver 75. During this revolution of the handwheel the slide 127 was raised to actuate the flash 143 which now exposes the numeral 3000 in the window 145.

When the unit weights 70 and 76 cooperate with the pendulums 40, the counterbalancing capacity of the scale is 4000 pounds, but since this is less than the weight of the load assumed in this example the counterbalancing capacity must still be further increased.

When the unit weight 76 was deposited on the receiver 75 the second time, the slide 127 was raised a distance which brought the upper edge of the beveled portion 129 to the level of a horizontal plane passing through the center of revolution of the roller 110. (This roller is a part of the assembly that includes the unit weight operating lever 79 which actuates the unit weight 71.) Another revolution of the handwheel therefore again lifts the unit weight 76 off the receiver 75 and the further upward movement of the slide 127 causes the aforementioned roller 110 to glide along the receding surface of the beveled portion 129 permitting the lever 79 to deposit the unit weight 71 on top of the unit weight 70 which is already suspended from the lever 16.

The deposition of the unit weight 71 conditions the scale to weigh loads up to 5000 pounds. Since the assumed weight of the load in this example is 4172 pounds, an increment of 4000 pounds is now counterbalanced by the two unit weights 70 and 71, and this amount is indicated by the flash 143 in the window 145. The remaining increment of 172 pounds is counterbalanced by the pendulums 40 and indicated by the indicator 57 on the chart 59. The sum of these indications is the weight of the load.

From the aforegoing it will be seen that by repeating the operations described, the weighing capacity of the scale can be progressively increased until all the unit weights are suspended from the lever 16. By rotating the handwheel 117 in an anticlockwise direction the unit weights that are suspended from the lever 16 may be returned to their inoperative positions thus conditioning the scale for another weighing operation.

In conditioning the scale for weighing the assumed load of 4172 pounds in the example hereinbefore described, the unit weights 70 and 71 were deposited on the member 69 and the unit weight 76, which had been actuated several times in conditioning the scale, remained in its inoperative position suspended from the operating lever 83.

In returning the unit weights to their inoperative positions, the first revolution of the handwheel 117 in an anticlockwise direction causes the cam 124 to lower the lever 83 and to deposit the unit weight 76 on the receiver 75. Rotation of the handwheel 117 in an anticlockwise direction causes the pinion 125 to move the slide 127 downwardly. Therefore, simultaneously with the lowering of the unit weight 76, the beveled portion 129 on the lower end of the slide 127 engages the roller 110 and forces this outwardly causing the unit weight operating lever 79 to rock in a clockwise direction and its ends engage the spool-like extensions and raises the unit weight 71 off the unit weight 70 which is still positioned on the receiver 69. Another anticlockwise revolution of the handwheel again lifts the unit weight 76 into its inoperative position. The length of the slide 127, the ratio of the gears, and the positions of the rollers 109 to 113 inclusive are so designed and proportioned that the beveled end of the slide 127 in its downward travel will engage one of the rollers 109 to 113 inclusive every second turn of the handwheel; therefore, when the unit weight 76 is now raised off the receiver 75 the beveled portion 129 of the slide is brought almost into engagement with the roller 109 and then with the next revolution of the handwheel which again drops the unit weight 76 on the receiver 75 it will cause the lever 78 to raise the weight 70 off the receiver 69 and then a final revolution of the handwheel raises the weight 76 and the scale is again in condition to perform another weighing operation.

Having described the invention, I claim:

1. In a device of the class described, in combination, weighing mechanism comprising load receiving means, automatic load counterbalancing mechanism operatively connected to said load receiving means, manipulative load counterbalancing mechanism operatively connected to said load receiving means for cooperation with said automatic load counterbalancing mechanism, a weight indicating means for each of said load counterbalancing mechanisms, said automatic load counterbalancing mechanism comprising a pendulum, said manipulative load counterbalancing mechanism including a series of weights and a single weight, a pair of suspended weight receiving members, a sliding member for actuating said series of weights, a handle, a cam connected to said handle for actuating said single weight, gearing operatively connected to said handle and said cam and actuating said sliding member whereby upon actuation of said handle said cam causes the single weight to be alternately deposited upon and removed from, one of said weight receiving members and the weights of said series of weights to be successively deposited on the other of said weight receiving members whenever said single weight is removed from its weight receiving member, each of said indicating means indicating the amount of the load counterbalanced by that load counterbalancing mechanism actuating said indicating means, said weight indicating means for indicating the amount of weight counterbalanced by said pendulum comprising a relatively movable chart and indicator, said indicating means for said manipulative load counterbalancing mechanism comprising a movably mounted plate bearing a number of weight indicating numerals and such number of weight indicating numerals on said movable plate being greater than the total number of weights in said series of weights and said single weight.

2. In a device of the class described, in combination, weighing mechanism including load receiving means, a beam lever operatively connected to said load receiving means, pendulum load counterbalancing mechanism operatively connected to said beam lever for counterbalancing a part of a load on said load receiving means, a pivot in said beam lever, manipulative load counterbalancing mechanism operatively engaging said pivot for counterbalancing the remainder of such load, said manipulative load counterbalancing mechanism including a series of unit weights of equal mass, a unit weight of lesser mass, an operating lever for each of said unit weights, a handle, a weight operating lever for each of said unit weights, a cam operatively connected to said handle for actuating the operating lever of said unit weight of lesser mass to cause said unit weight of lesser mass to exert influence on said load receiving means with each actuation of said handle and gearing operatively connected to said handle for sequentially actuating another of said unit weight operating levers to cause one of said unit weights of said series of unit weights of equal mass to exert influence on said load receiving means with each alternate actuation of said handle.

3. In a device of the class described, in combination, weighing mechanism comprising load receiving means, automatic load counterbalancing mechanism operatively connected thereto, manipulative load counterbalancing mechanism cooperating therewith, load indicating means actuated by said automatic load counterbalancing mechanism, a casing, a lever within said casing, a unit weight receiver connected to said lever, a plurality of pivotally supported two-armed operating levers, a unit weight held by one arm of each of said plurality of operating levers, a linearly movable member positioned to support the other arm of each of said operating levers to maintain the weight holding arm of each of said levers in elevated position, and means for imparting movement to said linearly movable member to withdraw such support for the arms of said operating levers whereby the weight of said unit weights held by said operating levers rock said operating levers about their pivotal support to deposit said unit weights on said unit weight receiver.

4. In a device of the class described, in combination, weighing mechanism comprising load receiving means, automatic load counterbalancing mechanism operatively connected thereto, manipulative load counterbalancing mechanism cooperating therewith, load indicating means actuated by said automatic load counterbalancing mechanism, a casing, a lever fulcrumed within said casing, a unit weight receiver pivotally connected to said lever, a bracket fixed to the interior of said casing, a plurality of operating levers pivotally supported in vertical alignment on said bracket, a unit weight held by one arm of each of said operating levers, a member linearly movable in said bracket and positioned to furnish support for the other arm of each of said operating levers to maintain the weight holding arm of each of said operating levers in elevated position and manipulative means extending exteriorly of said casing for imparting movement to said linearly movable member to successively withdraw such support for the arms of said operating levers whereby the weight of said unit weights held by said operating levers successively rock said operating levers about their pivotal support to deposit one of said unit weights on said load receiver and the other of said unit weights on the preceding unit weight on said load receiver.

5. In a device of the class described, in combination, weighing mechanism comprising load receiving means, automatic load counterbalancing mechanism operatively connected to said load receiving means, manipulative load counterbalancing mechanism operatively connected to said load receiving means for cooperation with said automatic load counterbalancing mechanism in counterbalancing weights of loads on said load receiving means, a weight indicating means actuated by each of said load counterbalancing mechanisms, said manipulative load counterbalancing mechanism including a series of weights and a single weight, a pair of weight receiving members suspended in spaced vertical relation from said weighing mechanism and manipulative means including a handle, a shaft connected to said handle, a cam mounted on said shaft, a pinion on said shaft and gear means actuated by said pinion whereby said single weight is alternately deposited upon or removed from one weight receiving member whenever said shaft is rotated through 360° and weights of said series are successively deposited on the other weight receiving member whenever said single weight is removed from its weight receiving member.

6. In a device of the class described, in combination, weighing mechanism including load receiving means, a pivoted beam lever, means operatively connecting said load receiving means to said beam lever at one side of the fulcrum thereof, manipulative load counterbalancing means including a plurality of weight receivers pivotally connected to said beam lever on the opposite side of its fulcrum, a series of unit weights, means for actuating said unit weights including a pivotally mounted lever for each of said unit weights, each of said levers having a bell crank-like arm, and a sliding member having a beveled face adapted to successively engage such bell crank-like arms to rock said unit weight operating levers about their fulcrums.

7. In a device of the class described, in combination, a lever, a pair of unit weight receivers suspended from said lever, a single weight, a series of unit weights, and a cam whereby said single unit weight is deposited upon and removed from one of said unit weight receivers and means whereby the unit weights of said series are sequentially deposited on the other of said unit weight receivers, and coordinating means whereby said cam for actuating said single unit weight is caused to alternately deposit said single unit weight on its unit weight receiver and remove said single unit weight from its unit weight receiver simultaneously with the deposition of each of the unit weights of said series upon the other of said unit weight receivers.

8. In a device of the class described, in combination a lever, a pair of unit weight receivers suspended from said lever, a series of unit weights, and means whereby one unit weight of said series is alternately deposited upon and removed from one of said unit weight receivers and the other unit weights of said series are successively deposited upon the other of said unit weight receivers, said first mentioned unit weight being removed from its receiver simultaneously with each successive deposition of the other unit weights of said series.

9. In a device of the class described, in combination, a pivotally mounted lever, a unit weight receiver suspended from said lever, a plurality of pivotally mounted unit weight operating levers, the axes of pivotal mounting of said unit weight operating levers extending perpendicularly to the longitudinal axis of said lever, a slidably mounted member for actuating said unit weight operating levers, a unit weight for each of said unit weight operating levers and manually actuated means, said manually actuated means including a shaft, a handwheel secured to said shaft and gearing actuated by said shaft for actuating said slidably mounted member whereby said unit weight operating levers are sequentially actuated to cause said unit weights to be deposited on said unit weight receivers.

10. In a device of the class described, in combination, a lever, two unit weight receivers suspended from a pivot mounted in said lever, a series of unit weight operating levers, a unit weight supported by each of said unit weight operating levers, means for sequentially actuating said unit weight operating levers for depositing some of said unit weights sequentially on one of said unit weight receivers and for alternately depositing and removing another of said unit weights from the other of said unit weight receivers.

HALVOR O. HEM.